US012147197B2

(12) United States Patent
Meleddu

(10) Patent No.: US 12,147,197 B2
(45) Date of Patent: Nov. 19, 2024

(54) BRACELET FASTENING DEVICE

(71) Applicant: Cartier International AG, Steinhausen (CH)

(72) Inventor: Antonio Meleddu, Lausanne (CH)

(73) Assignee: Cartier International AG, Steinhausen (CH)

( * ) Notice: Subject to any disclaimer, the term of this patent is extended or adjusted under 35 U.S.C. 154(b) by 419 days.

(21) Appl. No.: 17/637,793

(22) PCT Filed: Oct. 16, 2020

(86) PCT No.: PCT/EP2020/079249
§ 371 (c)(1),
(2) Date: Feb. 23, 2022

(87) PCT Pub. No.: WO2021/099041
PCT Pub. Date: May 27, 2021

(65) Prior Publication Data

US 2022/0283548 A1 Sep. 8, 2022

(30) Foreign Application Priority Data

Nov. 22, 2019 (EP) .................................... 19210895

(51) Int. Cl.
*G04B 37/14* (2006.01)
*A44C 5/14* (2006.01)

(52) U.S. Cl.
CPC ............ *G04B 37/1493* (2013.01); *A44C 5/14* (2013.01)

(58) Field of Classification Search
None
See application file for complete search history.

(56) References Cited

FOREIGN PATENT DOCUMENTS

| | | | |
|---|---|---|---|
| CH | 713218 | A1 | 6/2018 |
| EP | 2047766 | A2 | 4/2009 |
| JP | 4754249 | B2 | 8/2011 |
| WO | 2021099041 | A1 | 5/2021 |

OTHER PUBLICATIONS

Foreign Communication from a Related Counterpart Application, Written Opinion dated Jan. 11, 2021, International Application No. PCT/EP2020/079249 filed on Oct. 16, 2020.
Foreign Communication from a Related Counterpart Application, International Search Report dated Mar. 8, 2018, International Application No. PCT/EP2020/079249 filed on Oct. 16, 2020.
Foreign Communication from a Related Counterpart Application, European Search Report dated May 18, 2020, International Application No. 19210895.9 filed on Nov. 22, 2019.

*Primary Examiner* — Renee S Luebke
(74) *Attorney, Agent, or Firm* — Conley Rose, P.C.

(57) ABSTRACT

A device for fastening a wristlet to a watch case includes an end body of the wristlet, at least one movable fastening element comprising a pivot part movable between an engagement position in which the pivot part is engaged with the case, and a retracted position where the pivot part is disengaged from the case, a lever movably mounted in rotation on the end body, at least one movable cam engaged with the lever to switch the movable fastening element from the engagement position to the retracted position during a rotation of the lever, where the device comprises at least one static cam fixedly mounted on the end body facing the movable cam, to impose an axial movement on the movable cam during its rotation, and the movable cam is directly formed on the movable fastening element, and arranged between the lever and the static cam.

14 Claims, 4 Drawing Sheets

BRACELET FASTENING DEVICE

CROSS-REFERENCE TO RELATED APPLICATIONS

The present application is a filing under 35 U.S.C. 371 as the National Stage of International Application No. PCT/EP2020/079249, filed Oct. 16, 2020, entitled "BRACELET FASTENING DEVICE," which claims priority to European Application No. 19210895.9 filed with the Europe Patent Office on Nov. 22, 2019, both of which are incorporated herein by reference in their entirety for all purposes.

The present invention generally relates to a wristlet fastening device, intended to fasten a wristlet on a timepiece such as a watch.

Wristlet fastening devices are known in the prior art, such as those presented in documents CH713218A1, EP2047766A2, or JP4754249B2. In these devices, movable elements can fit in housings located in the horns of the watch case. However, these systems have in particular the drawback of requiring complex pieces to be manufactured which must in addition be resized according to the lug of the case.

One aim of the present invention is to overcome the drawbacks of the documents of the prior art mentioned above and particularly, first of all, to propose a device for fastening a wristlet for example to a watch case, which allows providing, to a certain extent, a standardization of the elements of the fastening device and/or of the wristlet, without making the manufacture more complex.

For that, a first aspect of the invention relates to a device for fastening a wristlet to a watch case, comprising:

- an end body of the wristlet,
- at least one movable fastening element comprising a pivot part and mounted in the end body to be movable between an engagement position in which the pivot part is arranged to engage with the case for example in a bore of a horn of the case, and a retracted position in which the pivot part is arranged to disengage from the case so as to be able to release the end body from the case,
- a lever movably mounted in rotation on the end body,
- at least one movable cam engaged with the lever to switch the movable fastening element from the engagement position to the retracted position during a rotation of the lever, characterized:

- in that the device comprises at least one static cam fixedly mounted on the end body facing the movable cam, to impose an axial movement on the movable cam during its rotation,
- and in that the movable cam is directly formed on the movable fastening element, and arranged between the lever and the static cam.

The fastening device according to the implementation above is a quick or reversible fastening device. It is indeed sufficient to actuate the lever in order to engage or disengage the pivot part of the case of the watch, so as to fasten or unfasten the end body, without using any additional tool. In addition, the movable cam is formed directly on the fastening element, which avoids providing it on the lever, which simplifies the manufacture of the lever and thus offers a possibility of standardization. Indeed, it can be provided to modify only the width of the lever in case of adaptation of the fastening device to another case model which would have a different width.

Advantageously, the movable fastening element is mounted in the end body in a sliding pivot connection.

Advantageously, the movable fastening element is engaged with the lever in a slide connection, preferably with the movable fastening element comprising a stud engaged in a groove of the lever, and more preferably the movable fastening element comprising two studs each engaged in a groove of the lever. Particularly, the studs are arranged at 180° from each other on a cylinder of the fastening element.

Advantageously, the static cam is driven into the end body.

Advantageously, the static cam comprises angular indexing means, such as a radial outgrowth, arranged to engage with the end body, so as to define a predefined angular orientation between the static cam and the end body.

Advantageously, the lever is movable between:

- an initial rest position in which the movable fastening element is in the engagement position, and
- an actuation position in which the movable fastening element is in the retracted position.

Advantageously, the end body comprises:

- a housing arranged to accommodate the lever in the initial rest position, and
- a stop arranged to define the maximally actuated position of the lever.

Advantageously, the fastening device comprises return means such as a spring, arranged to exert a push force on the movable fastening element towards the engagement position.

Advantageously, one of the movable cam-static cam assembly has a cam track with a rest portion such as a notch, the other of the movable cam-static cam assembly has a cam track with a top or a protrusion, and the movable fastening element is in the engagement position when the top or the protrusion is engaged with or positioned at the level of the rest portion.

Advantageously, the rest portion is adjacent to a cam slope, so that the return means maintain in a stable position the movable fastening element in the engagement position, and the lever in the initial rest position.

Advantageously, the pivot part of the movable fastening element passes through the static cam.

Advantageously, the pivot part is mounted in pivot connection in the static cam.

Advantageously, the fastening device comprises:

- two movable fastening elements,
- two static cams,
- in which:
  - the two movable fastening elements are arranged on either side of the lever,
  - the two static cams are each fixedly mounted on a flank of the end body,
  - the pivot parts of each movable fastening element each pass through a static cam so as to:
  - project from the static cam and/or from the end body in order to be able to engage with the case, for example in a bore of a horn of the case, when each movable fastening element is in the engagement position,
  - be retracted in the static cam and/or in the end body to release the end body from the case, when each movable fastening element is in the retracted position.

A second aspect of the invention relates to a watch wristlet comprising at least one fastening device according to the first aspect.

A third aspect of the invention relates to a wristwatch, comprising at least one fastening device according to the first aspect.

Other characteristics and advantages of the present invention will appear more clearly upon reading the following detailed description of one embodiment of the invention given by way of non-limiting example and illustrated by the appended drawings, wherein.

Figure 1:
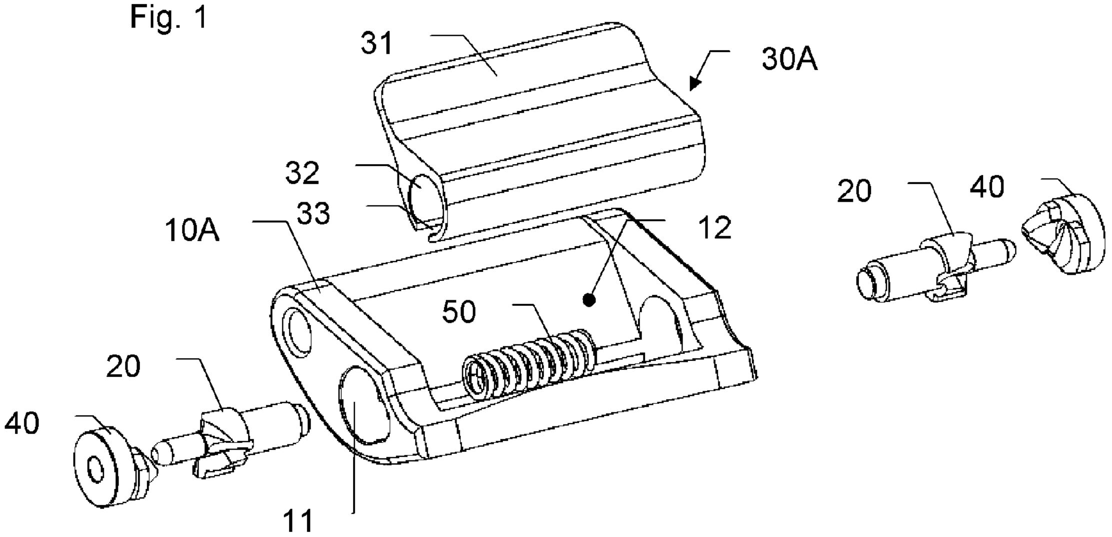
FIG. 1 represents a perspective view of a first embodiment of a fastening device according to the invention.

FIG. 1 represents a wristlet fastening device according to a first embodiment of the invention. The fastening device according to this embodiment comprises in particular two fastening elements 20 mounted in an end body 10A of the wristlet and in a lever 30 articulated in rotation on the end body 10A. In this first embodiment, the end body 10A is typically an end link of a link wristlet, that is to say comprising a plurality of links articulated to each other.

Figure 4:
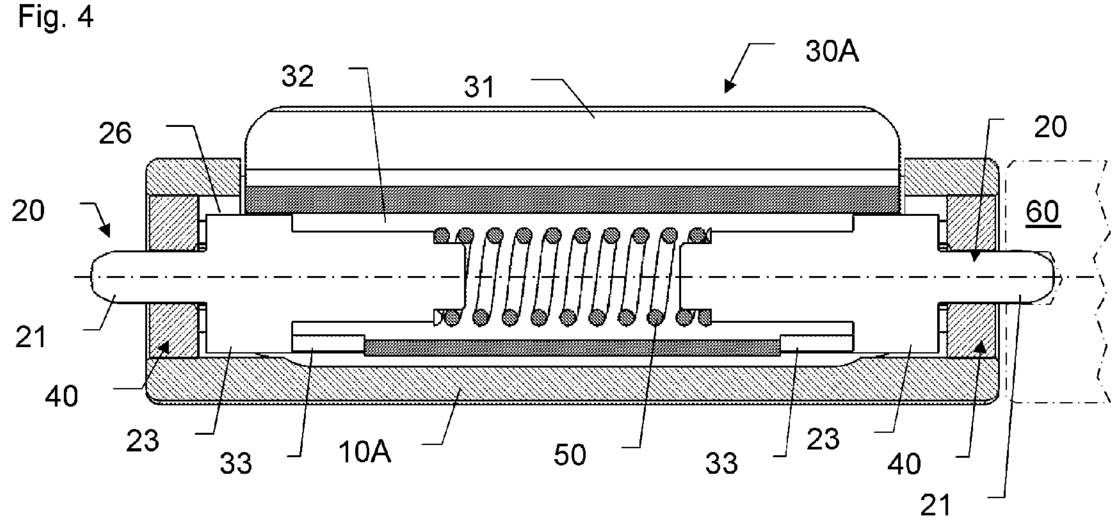
FIG. 4 represents a section of the fastening device of FIG. 1, with the fastening elements in an engagement position to fasten a wristlet end body with a watch case.

In addition, two static cams 40 are provided on each side of the end body 10A, and a spring 50 is mounted between the two fastening elements 20, in a bore 32 of the lever 30, just as part of the fastening elements 20 as shown in FIG. 4.

In general, the fastening device is provided to move the two fastening elements 20 between a retracted position (FIG. 5) in which the end body 10A is free relative to the case 60 of the watch (represented in thin dash-dot lines on the right only) and an engagement position (FIG. 4) in which the end body 10A, via the fastening elements, is fastened to the case 60 of the watch (still represented in thin dash-dot lines on the right only).

Indeed, the fastening elements 20 can be retracted into the end body (FIG. 5), or have a pivot part 21 projecting or protruding relative to the end body 10A (FIG. 4).

Figure 2:
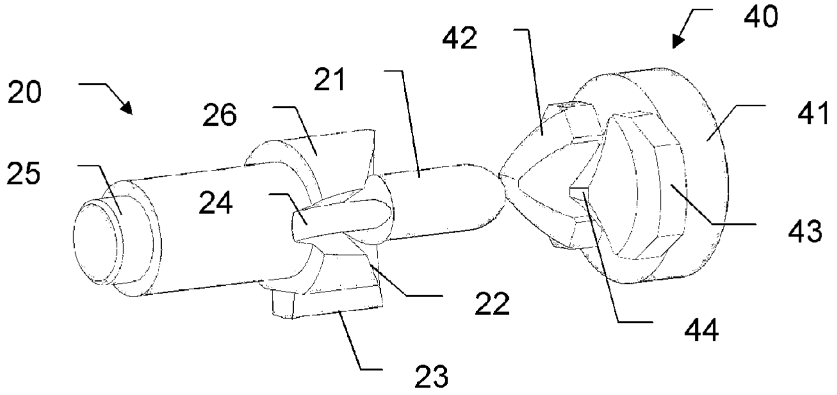
FIG. 2 represents a perspective view of a fastening element and a static cam of the fastening device of FIG. 1.

In detail, and as shown in FIG. 2, each fastening element 20 comprises a pivot part 21, a movable cam 22 comprising two movable cam tracks, a guide part 26, a stud 23 and a free end 25. The two movable cam tracks or movable cam 22 are separated by 180° opposite notches 24.

Facing each fastening element 20, it is provided to fixedly mount static cams 40 in the end body 10A, and which each comprise a base 41, two static cam tracks 42, and an outgrowth 43, which can be otherwise called wing. Each static cam 40 is fixedly mounted or driven into a bore 11 of the end body 10A, and the outgrowths 43 allow positioning the static cams 40 angularly relative to the end body 10A.

FIG. 2 shows a particular angular position between the fastening element 20 and the static cam 40: the tops 44 of the static cam tracks 42 are aligned with the notches 24 of the fastening element 20. In this position, and under the effect of the spring 50, it is understood that the movable cam tracks or movable cam 22 and the static cam tracks 42 will be nested into each other, and the pivot part 21 passes through the static cam 40, to leave it and project therefrom, as well shown in FIG. 4.

Figure 5:
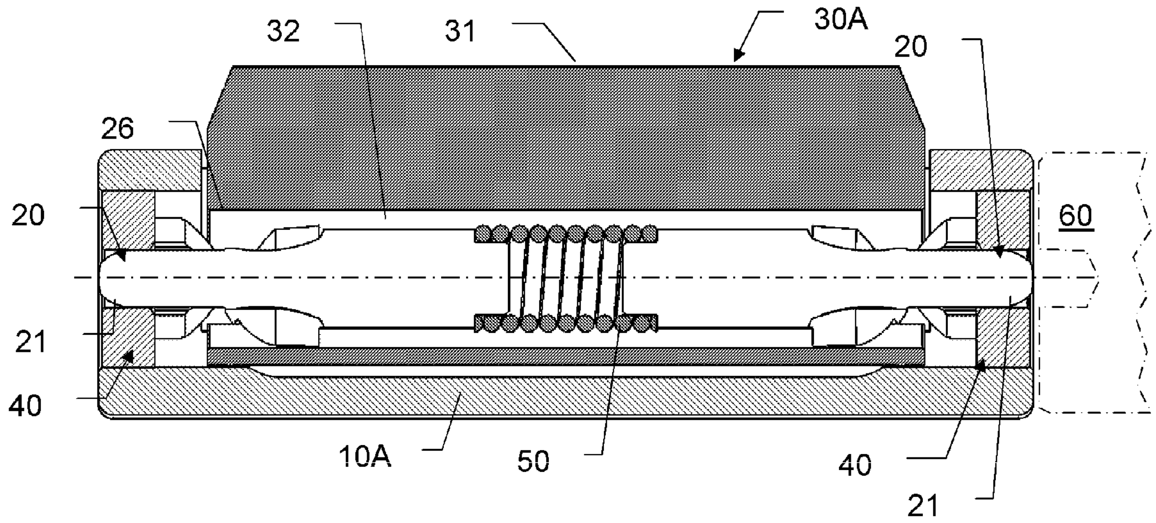
FIG. 5 represents a section of the fastening device of FIG. 1, with the fastening elements in a retracted position to release a wristlet end body from a watch case.

Starting from FIG. 2, if the fastening element 20 is pivoted by 90°, then the tops 44 will face the tops of the movable cam tracks or movable cam 22, so that the fastening element 20 will move away from the static cam 40, with the effect that the pivot part 21 enters the static cam 40, and does not jut out therefrom, as shown in FIG. 5.

Figure 3:
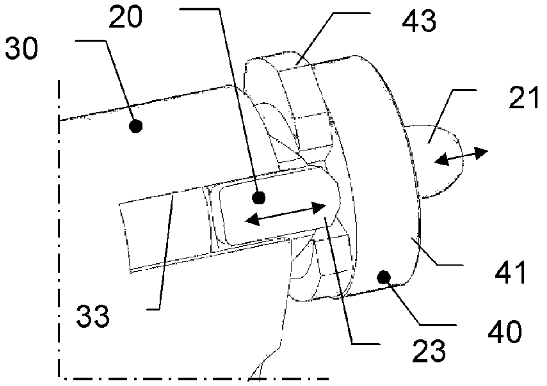
FIG. 3 represents a perspective view of a lever engaged with the element of fastening with the static cam of the fastening device of FIG. 1.

This kinematics is made possible by an action exerted by the user on the lever 30. The latter therefore comprises a bore 32, provided with a groove 33, visible in FIG. 1 and especially in FIG. 3. The stud 23 of the fastening element 20 is engaged in the groove 33, so that the connection between these two pieces is a slide connection, as shown by the double arrow in FIG. 3.

Consequently, and as the lever 30 is movably mounted in rotation on the end body 10A, a rotation of the lever 30 will also drive in rotation the fastening elements 20, which are each facing a static cam 40. Due to the force exerted by the spring 50, the movable cam tracks or movable cam 22 and the static cam tracks 42 will cooperate to cause, due to the relative rotational movement, an axial movement in the lever 30 of each fastening element 20.

As shown in FIG. 1, the end body 10A has a housing 12 in which the lever 30 can be housed when it is in an initial rest position, which corresponds to FIG. 4, where the fastening elements 20 are in the engagement position. In this position, the spring 50 therefore presses on the fastening elements 20, with the tops 44 of the static cam tracks 42 aligned with the notches 24 of the fastening element 20.

This position is a stable rest position because, in order to leave it, it is necessary to bias the spring 50. In other words, due to the engagement of the tops 44 of the static cam tracks 42 aligned with the notches 24 of the fastening element 20, the spring 50 maintains the lever 30 in the initial rest position.

To actuate the mechanism, a user can act on a free end 31 of the lever 30, to pivot it out of the housing 12 and bring the lever 30 into mechanical abutment on the end body, after a 90° rotation for example. Thus, the tops 44 of the static cam tracks 42 are made to face the tops of the movable cam tracks or movable cam 22, which makes the fastening elements 20 "enter" the lever 30 to retract them. The user can unfasten and release the end body from the watch case 60 because the pivot parts 21 are no longer projecting relative to the end body 10A.

As clearly shown in FIGS. 4 and 5, it can be noticed that the lever 30 is mounted in rotation on the end body 10A, via the fastening elements 20 and the static cams 40. Indeed, each fastening element 20 has a guide part 26 mounted in the bore 32 of the lever 30, and the pivot part 21 of each fastening element 20 being mounted in a bore of each static cam 40, these being driven into the end body 10A.

Figure 6:
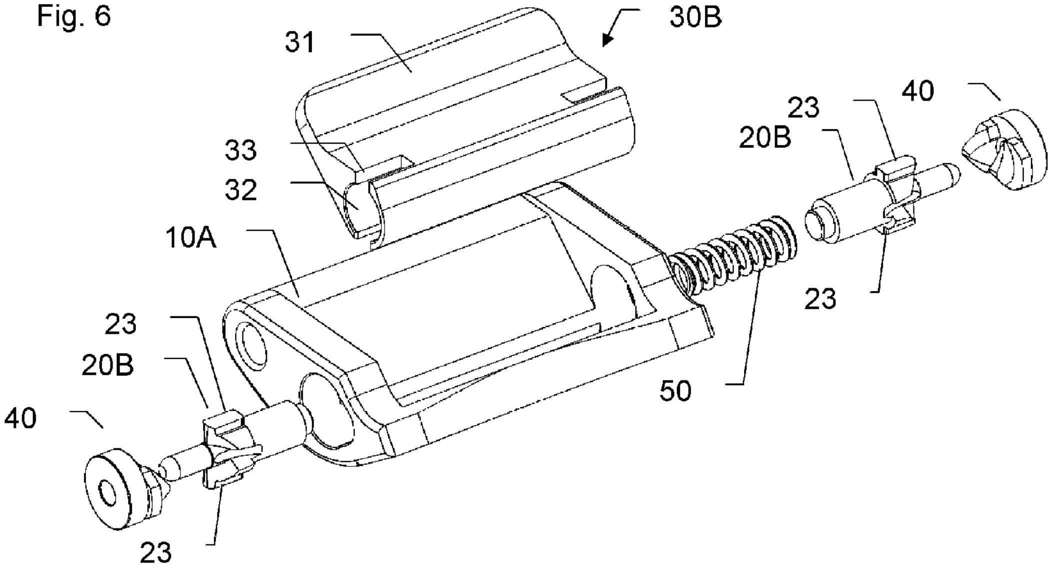
FIG. 6 represents a second embodiment of a fastening device comprising a lever made according to one alternative to the lever of the fastening device of FIG. 1.

FIG. 6 represents a second embodiment (a manufacturing variant of the first embodiment) with a lever 30B which still comprises a bore 32, but two grooves 33, so that the fastening elements 20B can have two 180° opposite studs 23. All the rest of the fastening device being identical to the fastening device of FIG. 1, this will not be described again.

Figure 7:
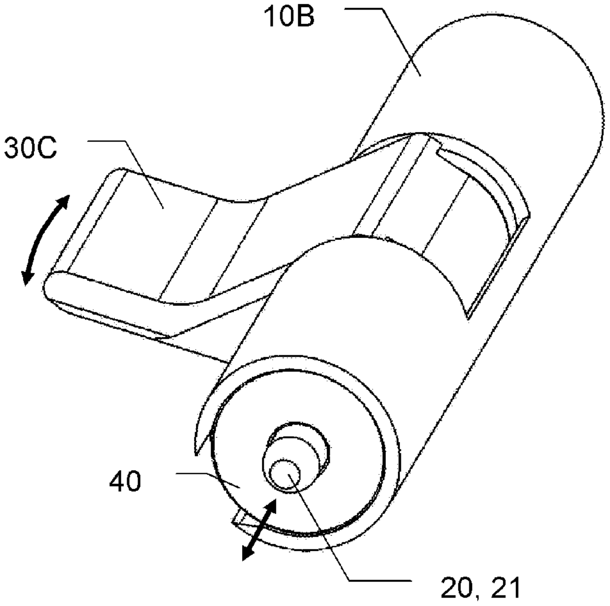
FIG. 7 represents a fastening device according to a third embodiment.

FIG. 7 represents a third embodiment of a fastening device, with an end body 10B which has a cylindrical outer shape to be able to form an insert to be integrated into the end of a flexible wristlet, made of leather or polymer for example.

Figure 8:
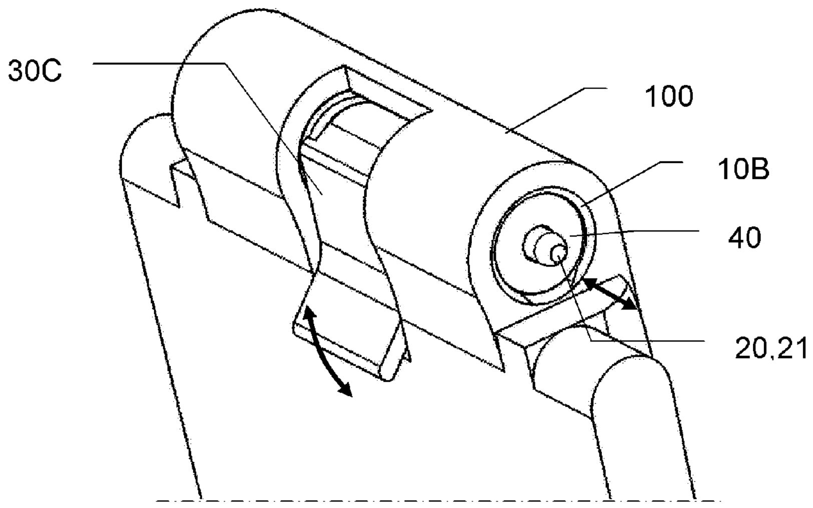
FIG. 8 represents the fastening device of FIG. 7 integrated into a flexible wristlet.

The end body 10B has an inner bore which accommodates the static cams 40 and the fastening elements 20 (whose FIGS. 7 and 8 show the pivot part 21 protruding from the static cam 40) identical to the first embodiment: the static cams 40 are driven on each side in the end body 10B, so as to trap the fastening elements 20 and the spring (not visible).

As in the first embodiment, the end body 10B has a central housing in which the lever 30C is positioned, the latter being mounted in rotation relative to the end body 10B via the fastening elements 20 and the static cams (the mounting is identical to that of FIGS. 4 and 5 described above).

The end body 10B forms, in this third embodiment, an insert to be integrated into the end of a flexible wristlet 100. As shown in FIG. 8, the end body 10B is mounted at the end of the flexible wristlet 100, by techniques known to those skilled in the art, of the bonding or sewing type. A central passage slot for the lever 30C is also provided at the end of the flexible wristlet 100 in order to allow a user to actuate the lever 30C to make it pivot and unfasten/fasten the flexible wristlet 100 from/to a watch case.

It appears that the static cams 40 are inserts driven into the end body, that the fastening elements 20 embed the movable cam tracks or movable cam 22, so that all these elements are independent pieces that can be easily used for wristlets of different sizes or with special outer shapes, which allows using these elements for several models. Thus, the most complex pieces to be machined are identical regardless of the dimensions of the lug of the case, the static cams 40 and the fastening elements 20 are identical. The specific width-specific components are the end body 10B, the inner spring and the lever 30C which are pieces less complicated to machine. The manufacturing processes or settings of the most complex pieces are therefore not changed.

Furthermore, the mounting does not require fixing the lever 30, 30B, 30C beforehand on the end body 10A or 10B, since the pivot connection between these two pieces is provided by the fastening device itself: the manufacture is faster. Particularly, on each side of the end body, a static cam 40 is driven (or force-fitted) into the end body 10A or 10B and comprises a through hole, which receives and guides the pivot part 21 of a fastening element 20. Each fastening element 20 also comprises a guide part 26 housed in the bore 32 of the lever 30, 30B or 30C, so that each guide element 20 provides the mechanical connection between the end body 10A or 10B and the lever 30, 30B or 30C.

It will be understood that various modifications and/or improvements obvious to those skilled in the art can be made to the various embodiments of the invention described in the present description without departing from the scope of the invention defined by the appended claims. Particularly, reference is made to a tight or driven mounting of each static cam on the end body, but a mounting by screwing or by elastic interlocking (clipping) for example can be envisaged.

The invention claimed is:

1. A device for fastening a wristlet to a watch case, comprising:
- an end body of the wristlet,
- at least one movable fastening element comprising a pivot part and mounted in the end body to be movable between an engagement position in which the pivot part is arranged to engage with the case, and a retracted position in which the pivot part is arranged to disengage from the case so as to be able to release the end body from the case,
- a lever movably mounted in rotation on the end body,
- at least one movable cam engaged with the lever to switch the movable fastening element from the engagement position to the retracted position during a rotation of the lever, characterized:
- in that the device comprises at least one static cam fixedly mounted on the end body and facing the movable cam to impose an axial movement on the movable cam during a rotation of the movable cam,
- and in that the movable cam is directly formed on the movable fastening element, and arranged between the lever and the static cam.

2. The fastening device according to claim 1, wherein the movable fastening element is mounted in the end body in a sliding pivot connection.

3. The fastening device according to claim 1, wherein the movable fastening element is engaged with the lever in a slide connection.

4. The fastening device according to claim 1, wherein the static cam is driven into the end body.

5. The fastening device according to claim 1, wherein the static cam comprises angular indexing means arranged to engage with the end body, so as to define a predefined angular orientation between the static cam and the end body.

6. The fastening device according to claim 1, wherein:
- the lever is movable between:
  - an initial rest position in which the movable fastening element is in the engagement position, and
  - an actuation position in which the movable fastening element is in the retracted position,
- the end body comprises:
  - a housing arranged to accommodate the lever in the initial rest position, and
  - a stop arranged to define the maximally actuated position of the lever.

7. The fastening device according to claim 1, comprising return means arranged to exert a push force on the movable fastening element towards the engagement position.

8. The fastening device according to claim 1, wherein
- one of the movable cam or static cam has a cam track with a rest portion,
- the other of the movable cam or the static cam has a cam track with a top or a protrusion,
- and wherein the movable fastening element is in the engagement position when the top or the protrusion is engaged with or positioned at a level of the rest portion.

9. The fastening device according to claim 8, wherein the rest portion is adjacent to a cam slope, so that the return means maintains in a stable position the movable fastening element in the engagement position, and the lever in the initial rest position.

10. The fastening device according to claim 1, wherein the pivot part of the movable fastening element passes through the static cam.

11. The fastening device according to claim 10, wherein the pivot part is mounted in pivot connection in the static cam.

12. The fastening device according to claim 1, comprising:
- two movable fastening elements,
- two static cams,
- wherein:
  - the two movable fastening elements are arranged on either side of the lever,
  - the two static cams are each fixedly mounted on a flank of the end body,
  - the pivot parts of each movable fastening element each pass through a static cam so as to:

project from the static cam and/or from the end body in order to be able to engage with the case when each movable fastening element is in the engagement position, be retracted in the static cam and/or in the end body to release the end body from the case, when each movable fastening element is in the retracted position.

13. A watch wristlet comprising at least one fastening device according to claim 1.

14. A wristwatch, comprising at least one fastening device according to claim 1.

* * * * *